Oct. 28, 1947.                R. GOLDSMITH                2,429,955
                         INSULATING STRUCTURE
                         Filed July 6, 1945
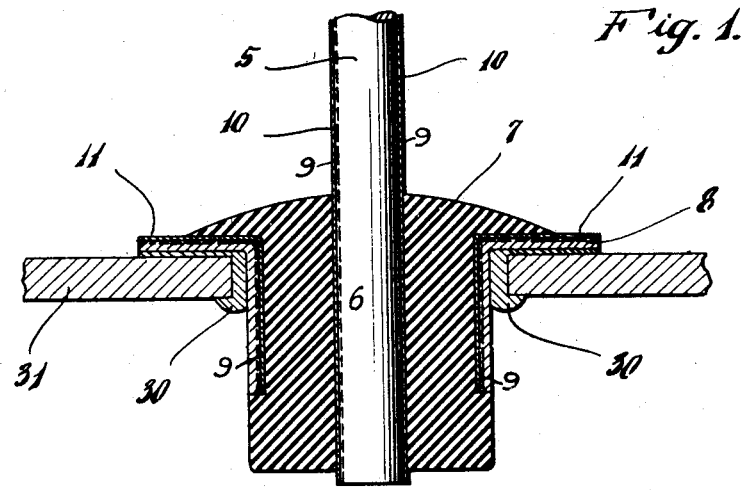
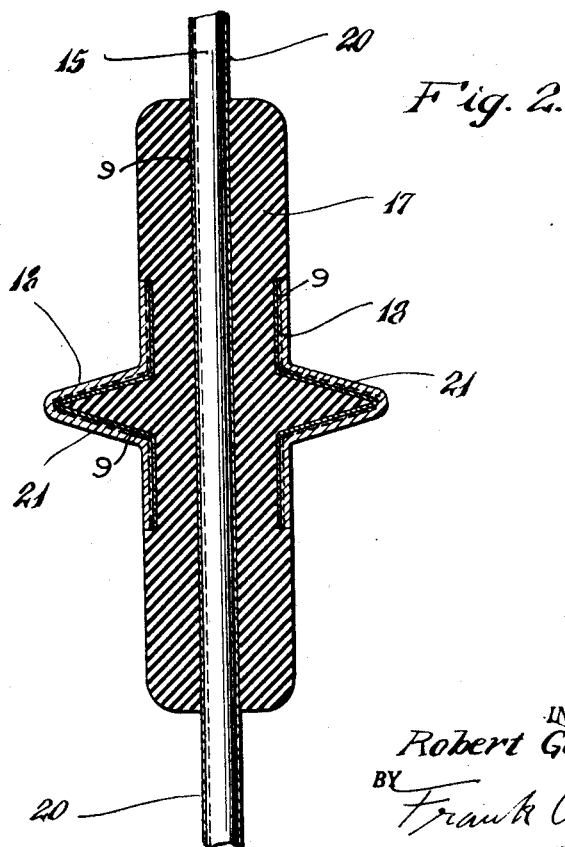
INVENTOR.
Robert Goldsmith
BY Frank A. Bauer
ATTORNEY.

Patented Oct. 28, 1947

2,429,955

UNITED STATES PATENT OFFICE 2,429,955

INSULATING STRUCTURE

Robert Goldsmith, Great Notch, N. J., assignor to Electronic Mechanics Inc., Clifton, N. J., a corporation of New Jersey Application July 6, 1945, Serial No. 603,516

3 Claims. (Cl. 174—153)

This invention relates to electrical insulation for conductors, terminals and the like and particularly to such insulation having a strong bond with metallic surfaces.

The object of the invention is to provide an insulating structure of glass-bound mica material and metal which will provide a tight, lasting, leak-proof bond secure against weakening or failure in service.

Further objects of the invention, particularly in the process of formation of the bond between the parts, will appear from the specification taken in connection with the accompanying drawing in which Fig. 1 is a sectional view of an insulating structure embodying the invention; and Fig. 2 is a similar view of a modified form.

In the embodiment illustrated in Fig. 1, a terminal 5 which may be of alloy such as nickel steel (35 to 40% nickel) has its inner end 6 passing through insulation 7 carrying the peripheral bushing 8 of metal such as stainless steel or the like. These parts are rigidly formed together by the molding of the insulation in place between the terminal and the bushing and it is important to secure a firm, leak-proof adhesion between the metal and the insulation which is of glass-bound mica.

To attain this, the metal surfaces are enameled with one or more coats. For instance, a special ground coat indicated at 9 may be applied to the surface of the terminal 5, the composition of the coating containing an ingredient such as cobalt or the like to secure a firm bond to the nickel steel. The ground coat when used is heated to softening and without cooling is provided with one or more cover coats of enamel, for instance, in the form of dry, ground enamel powder also heated in place and of a composition which will strongly adhere to the glass-bound insulation and during processing under heat will be soft or tacky at a temperature below that to which the glass-bound mica is heated during molding. Preferably, this enamel should have a coefficient of expansion similar to that of the glass-bound mica or in any event between those of the glass-bound mica and the metal terminal.

The metal terminal 5 with its enamel coating 10 as above described is then molded in place in the insulation 7. The terminal may be heated but can be cold when inserted in the mold. The glass-mica composition is preferably in powdered or pellet form and shaped in place on the terminal 5 under pressure by the molding dies. The glass-mica composition is pre-heated to plastic condition and cools in the mold under pressure until it solidifies. In this way the insulation is heated to plastic condition and applied at high pressure to the coated metal which preferably is raised in temperature which generally is below that of the plastic and then the plastic and metal cool together under the die pressure.

Usually, the structure includes an outer metallic member such as bushing 8 and this has its surface coated with enamel 11 compatible with and adhering to the metal, such as stainless steel or the like, which has a coefficient of expansion greater than that of the glass-bound mica, the coefficient of which in turn is greater than that of the central terminal. The enamel 11 of the outer bushing will have a coefficient of expansion close to that of the insulation or between the insulation and the bushing which will be heated preparatory to the molding to a temperature near enough to that of the hot plastic insulation to avoid surface chilling at the time of contact.

Then during molding all of the parts are at high temperature throughout, and cooled together. The outer bushing 8 shrinks on the insulation 7 which at the same time shrinks on the terminal 5, since the coefficients of expansion are progressively less toward the center. The enamel cooperates to maintain firm surface bonding and adherence between the insulation and the metal.

The structure shown in Fig. 2 is similar to that shown in Fig. 1 and is similarly formed. The metal conductor 15 has an enamel coating 20 and is rigidly set in the glass bound mica insulator 17 provided at its periphery with the double bushing 18 enameled at 21. The entire structure is built in accordance with the procedures as above described, securing a firm bond between the metal surfaces and the glass-bound mica.

As indicated in Fig. 1, the outer bushings are fastened in place, as a rule, by cement or solder 30 between the bushing and the edges of an orifice through a support 31.

The glass bonded mica thus forms a strong support for the terminal or other conductor and may be employed to pass current through the wall or partition of any electrical device. The glass bonded mica is also advantageous with high frequency circuits and the intimate, leak-proof adherence to metal qualifies it for use in connection with vacuum tubes, crystal containers, and pressure systems generally wherever enclosures are to be maintained gas-tight.

While the invention has been described in connection with specific embodiments it is not limited thereto. Other metals may be used such as molybdenum at the center and aluminum at the periphery and various forms of structures adapted to particular conditions will be evident from the foregoing description and within the scope of the appended claims.

I claim:

1. An insulating bushing structure comprising an inner metal conductor and an outer metal bushing having a higher coefficient of expansion and contraction, enamel coatings on the surfaces of said metal, and a glass bound mica insulation between said enamel coatings on said conductor and said bushing and having a coefficient of expansion and contraction greater than that of said conductor and less than that of the bushing.

2. An electrical insulation structure as set forth in claim 1 in which there is a ground coat between the enamel coating and the metal.

3. A process for formation of an electrical insulating structure comprising assembling a metallic conductor and a surrounding bushing having coatings of enamel on their adjacent surfaces and with a plastic mass of glass bound mica insulation between the conductor and bushing and in engagement with said enamel coatings, the coefficient of expansion and contraction of said plastic mass being less than that of said bushing and heat being applied to insure plasticity of said insulation and softness of said enamel coatings to effect a proper bond between them, and maintaining said heated condition and applying pressure to bind the insulation with the metal parts and enamel, and then cooling the parts together to form a firm and leak-proof bond between the metal and the insulation.

ROBERT GOLDSMITH.

REFERENCES CITED

The following references are of record in the file of this patent:

UNITED STATES PATENTS

| Number | Name | Date |
| --- | --- | --- |
| 1,974,298 | Case | Sept. 18, 1934 |
| 1,944,138 | King | Jan. 16, 1934 |
| 2,100,187 | Handrek | Nov. 23, 1937 |
| 1,888,070 | Buechner | Nov. 15, 1932 |
| 1,888,071 | Case | Nov. 15, 1932 |
| 2,014,809 | Kuhle, et al | Sept. 17, 1935 |
| 2,200,694 | Gerecke et al. | May 14, 1940 |